US012679460B2

(12) United States Patent
Nicodemus et al.

(10) Patent No.: US 12,679,460 B2
(45) Date of Patent: Jul. 14, 2026

(54) METHOD FOR PLANNING AN AVP OPERATION

(71) Applicant: Robert Bosch GmbH, Stuttgart (DE)

(72) Inventors: Rolf Nicodemus, Bietigheim-Bissingen (DE); Stefan Nordbruch, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 15 days.

(21) Appl. No.: 18/729,374

(22) PCT Filed: Feb. 2, 2023

(86) PCT No.: PCT/EP2023/052577
§ 371 (c)(1),
(2) Date: Jul. 16, 2024

(87) PCT Pub. No.: WO2023/186375
PCT Pub. Date: Oct. 5, 2023

(65) Prior Publication Data
US 2025/0083745 A1 Mar. 13, 2025

(30) Foreign Application Priority Data
Apr. 1, 2022 (DE) ..................... 10 2022 203 272.1

(51) Int. Cl.
*B62D 15/02* (2006.01)
(52) U.S. Cl.
CPC ................................ *B62D 15/0285* (2013.01)
(58) Field of Classification Search
None
See application file for complete search history.

(56) References Cited

U.S. PATENT DOCUMENTS 5,910,817 A * 6/1999 Ohashi ..................... G08G 1/04
348/160
10,059,331 B2 * 8/2018 Seo ........................ B60W 10/10
(Continued)

FOREIGN PATENT DOCUMENTS

CN 113665565 A 11/2021
DE 102012222562 A1 6/2014
(Continued)

OTHER PUBLICATIONS

International Search Report for PCT/EP2023/052577, Issued May 9, 2023.

*Primary Examiner* — Fekadeselassie Girma
(74) *Attorney, Agent, or Firm* — NORTON ROSE FULBRIGHT US LLP

(57) ABSTRACT

A method for planning an AVP operation for a motor vehicle within a parking lot using an infrastructure AVP system. The parking lot includes a plurality of regions, within each of which an AVP operation according to a different AVP type can be performed. The method includes the following steps: ascertaining for which infrastructure AVP types the AVP system is configured to perform an AVP operation; ascertaining within which region of the plurality of regions which of the infrastructure AVP types ascertained can be used for performing an AVP operation; ascertaining for which vehicle AVP type(s) the motor vehicle is configured to perform an AVP operation; planning an AVP operation for the motor vehicle to be performed within the parking lot, based on the infrastructure AVP types ascertained corresponding in each case to the plurality of regions and based on the vehicle AVP type(s) ascertained.

9 Claims, 2 Drawing Sheets

(56)  References Cited

U.S. PATENT DOCUMENTS

| | | | | |
|---|---|---|---|---|
| 10,407,008 B2 * | 9/2019 | Bonnet | .............. | B62D 15/0285 |
| 10,625,733 B2 * | 4/2020 | Cheaz | ................... | B60W 30/06 |
| 11,225,246 B2 * | 1/2022 | Jie | ......................... | B60W 30/06 |
| 11,584,364 B2 * | 2/2023 | Shimamoto | ........... | B60W 30/06 |
| 2013/0144492 A1 * | 6/2013 | Takano | .............. | B62D 15/0285 |
| | | | | 701/1 |
| 2018/0012156 A1 * | 1/2018 | Voelz | ................... | G05D 1/0285 |
| 2020/0290601 A1 * | 9/2020 | Yamanaka | ............ | B60W 10/20 |
| 2021/0009111 A1 | 1/2021 | Kang | | |
| 2022/0355790 A1 * | 11/2022 | Sugano | .............. | B60W 60/001 |

FOREIGN PATENT DOCUMENTS

| | | | | |
|---|---|---|---|---|
| DE | 102015201205 A1 * | 7/2016 | .............. | B60L 58/10 |
| DE | 102016206149 A1 | 10/2017 | | |
| JP | 2016006605 A | 1/2016 | | |
| WO | 2021220599 A1 | 11/2021 | | |
| WO | WO-2022057737 A1 * | 3/2022 | .............. | G05D 1/69 |

* cited by examiner

Fig. 1 ascertain for which
infrastructure AVP types
the AVP system is configured
to perform an AVP operation ascertain for which region
of the infrastructure which
of the ascertained AVP types can
be used for performing the AVP
operation ascertain for which vehicle
AVP type(s) the motor vehicle
is configured to perform an
AVP operation

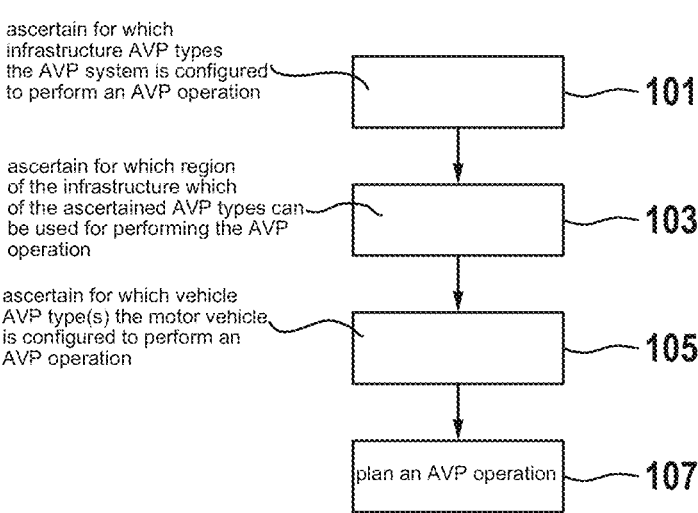

plan an AVP operation — 107

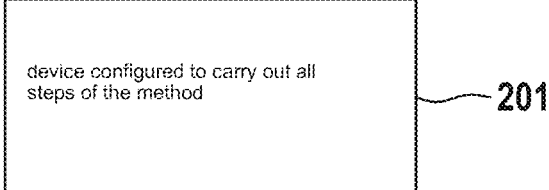

device configured to carry out all
steps of the method — 201

Fig. 3

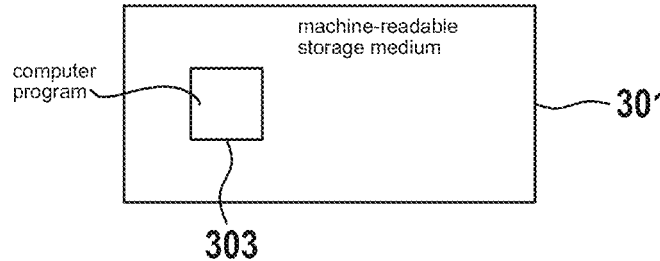

machine-readable
storage medium computer
program

301

303

METHOD FOR PLANNING AN AVP OPERATION

FIELD

The present invention relates to a method for planning an AVP operation for a motor vehicle, a device, a computer program and a machine-readable storage medium.

BACKGROUND INFORMATION

German Patent Application No. DE 10 2012 222 562 A1 describes a system for managed parking areas for transferring a vehicle from a start position to a target position.

SUMMARY

An object of the present invention is to provide for efficiently planning an AVP operation for a motor vehicle within a parking lot.

This object may be achieved with features of the present invention. Advantageous configurations of the present invention are disclosed herein.

According to a first aspect of the present invention, a method for planning an AVP operation for a motor vehicle within a parking lot using an infrastructure AVP system is provided. According to an example embodiment of the present invention, the AVP system is configured for at least two AVP types for performing an AVP operation, wherein an AVP type is an element selected from the following group of AVP types: AVP type 1, AVP type 2, and AVP type 3, wherein AVP type 1 is a vehicle-centered AVP operation, wherein AVP type 2 is an infrastructure-centered AVP operation, and wherein AVP type 3 is a shared vehicle-infrastructure AVP operation, wherein the parking lot comprises a plurality of regions, within each of which an AVP operation according to a different AVP type can be performed. According to an example embodiment of the present invention, the method includes the following steps:

ascertaining for which infrastructure AVP types the AVP system is configured to perform an AVP operation, ascertaining within which region of the plurality of regions which of the infrastructure AVP types ascertained can be used for performing an AVP operation, ascertaining for which vehicle AVP type(s) the motor vehicle is configured to perform an AVP operation, planning an AVP operation for the motor vehicle to be performed within the parking lot, based on the infrastructure AVP types ascertained corresponding in each case to the plurality of regions and based on the vehicle AVP type(s) ascertained.

According to a second aspect of the present invention, a device is provided, which is configured to carry out all steps of the method according to the first aspect of the present invention.

According to a third aspect of the present invention, a computer program is provided, which comprises instructions which, when the computer program is carried out by a computer, for example by the device according to the second aspect of the present invention, cause this computer to carry out a method according to the first aspect of the present invention.

According to a fourth aspect of the present invention, a machine-readable storage medium is provided, on which the computer program according to the third aspect of the present invention is stored.

The present invention is based on and includes the finding that it is ascertained, for each region of the parking lot, based on which AVP type(s) an AVP operation can be performed for the motor vehicle within the corresponding region of the parking lot using an infrastructure AVP system. It is further ascertained which AVP type(s) the motor vehicle offers for an AVP operation within a parking lot.

The technical conditions existing in both the infrastructure AVP system, with respect to the individual regions of the parking lot, and the motor vehicle are thus ascertained in order to carry out or perform an AVP operation. These different technical conditions can be classified into three AVP types: AVP type 1, AVP type 2, and AVP type 3.

AVP type 1 denotes a vehicle-centered AVP operation. The primary responsibility for the AVP operation rests with the motor vehicle.

AVP type 2 denotes an infrastructure-centered AVP operation. The primary responsibility for the AVP operation rests with the infrastructure, i.e., with the AVP system.

AVP type 3 denotes a shared vehicle-infrastructure AVP operation. Here, a primary responsibility for the AVP operation is shared between the motor vehicle and the AVP system.

If, after the ascertaining steps, it is thus known which AVP types are possible within the regions, and which AVP types the motor vehicle can offer, the AVP operation can be efficiently planned.

This in particular brings about the technical advantage that features according to the present invention for efficiently planning an AVP operation for a motor vehicle within a parking lot are provided.

An AVP operation comprises the following operations or functions:

1. Determining a target position, located within the parking lot, for the motor vehicle.
  2. Planning a route from a start position, comprised by the parking lot, to the target position.
  3. Detecting an object and/or an event and responding accordingly to a detected object and/or to a detected event.
  4. Locating the motor vehicle within the parking lot.
  5. Calculating a desired trajectory for the motor vehicle based on the planned route.
  6. Controlling a lateral and longitudinal guidance of the motor vehicle based on the calculated desired trajectory.

An assignment as to which of these operations or functions are performed, depending on the AVP type, by the motor vehicle or by the AVP system is indicated by the following table, wherein "I" stands for "infrastructure", i.e., for the AVP system, and "K" stands for "motor vehicle" so that "I" indicates that the operation is performed by the AVP system, and "K" indicates that the operation is performed by the motor vehicle:

| Functions | AVP type 1 | AVP type 2 | AVP type 3 |
|---|---|---|---|
| Determining a target position, located within the parking lot, for the motor vehicle. | I & K | I | I |
| Planning a route from a start position, comprised by the parking lot, to the target position. | K | I | I |
| Detecting an object and/or an event and responding accordingly to a detected | K ( & optionally I) | I | I & K |

-continued

| Functions | AVP type 1 | AVP type 2 | AVP type 3 |
|---|---|---|---|
| object and/or to a detected event. | | | |
| Locating the motor vehicle within the parking lot. | K | I | K |
| Calculating a desired trajectory for the motor vehicle based on the planned route. | K | I | K |
| Controlling a lateral guidance and longitudinal guidance of the motor vehicle based on the calculated desired trajectory. | K | K | K |

The table above thus indicates specifically for each AVP type for each function whether the function is performed by the infrastructure, i.e., by the infrastructure AVP system, or by the motor vehicle. In some cases, it may be provided that the function is carried out by both the AVP system and the motor vehicle.

Regarding object detection and event detection for AVP type 1, it may optionally be provided that, in addition to the motor vehicle, the AVP system of the infrastructure also carries out this function.

The AVP types 1, 2, and 3 described here are also described in detail in ISO 23374.

According to one embodiment of the method of the present invention, the motor vehicle is an at least highly automated motor vehicle. Such a motor vehicle is configured for at least highly automated guidance. Highly automated guidance corresponds to automation level 4 as defined by the Bundesanstalt für Straßenwesen [German Federal Highway Research Institute] (BASt).

The fact that the motor vehicle is configured at least for highly automated guidance means that the motor vehicle is configured both for highly automated guidance and for fully automated guidance. Fully automated guidance corresponds to automation level 5 as defined by BASt.

Highly automated guidance means that, for a certain period of time in a specific situation (for example: driving on a freeway, driving within a parking lot, passing an object, driving within a travel lane defined by lane markings), longitudinal guidance and lateral guidance of the motor vehicle are controlled automatically. A driver of the motor vehicle does not have to manually control the longitudinal guidance and lateral guidance of the motor vehicle himself/ herself. The driver does not have to continuously monitor the automatic control of the longitudinal guidance and lateral guidance in order to be able to intervene manually if necessary. If necessary, a take-over prompt is automatically issued to the driver to take over control of the longitudinal guidance and lateral guidance, in particular issued with adequate time to respond. The driver thus has to potentially be able to take control of the longitudinal guidance and lateral guidance. Limits of the automatic control of the lateral guidance and longitudinal guidance are recognized automatically. In highly automated guidance, it is not possible to automatically bring about a minimal risk state in every initial situation.

Fully automated guidance means that, in a specific situation (for example: driving on a freeway, driving within a parking lot, passing an object, driving within a travel lane defined by lane markings), longitudinal guidance and lateral guidance of the motor vehicle are controlled automatically. A driver of the motor vehicle does not have to manually control the longitudinal guidance and lateral guidance of the motor vehicle himself/herself. The driver does not have to monitor the automatic control of the longitudinal guidance and lateral guidance in order to be able to intervene manually if necessary. Before the automatic control of the lateral guidance and longitudinal guidance is ended, the driver is automatically prompted to take over the driving task (control of the lateral guidance and longitudinal guidance of the motor vehicle), in particular with adequate time to respond. If the driver does not take over the driving task, the system automatically returns to a minimal risk state. Limits of the automatic control of the lateral guidance and longitudinal guidance are recognized automatically. In all situations, it is possible to automatically return to a minimal risk system state.

The abbreviation "AVP" stands for "Automated Valet Parking". An AVP operation comprises, for example, at least highly automated guidance of the motor vehicle from a drop-off position to a parking position and, for example, at least highly automated guidance of the motor vehicle from a parking position to a pick-up position. At the drop-off position, a driver of the motor vehicle drops the motor vehicle off for an AVP operation. At a pick-up position, the motor vehicle is picked up after the AVP operation has ended.

A motor vehicle within the meaning of the description can thus also be referred to as an AVP motor vehicle insofar as it is configured to perform an AVP operation.

In one embodiment of the method of the present invention, it is provided that planning comprises determining within which region(s) the AVP operation for the motor vehicle can be performed.

This, for example, brings about the technical advantage that the AVP operation can be planned efficiently. Furthermore, this, for example, brings about the technical advantage that, following planning, the AVP operation can be performed efficiently.

It is thus defined which region(s) of the parking lot are actually suitable for the motor vehicle to perform an AVP operation within the corresponding region(s). Within the parking lot, there may for example be regions which, due to the corresponding AVP types, are not suitable for the motor vehicle to perform an AVP operation within the region. If, for example, a region offers AVP type 1, but the motor vehicle itself can only offer AVP type 2, the motor vehicle cannot perform an AVP operation in this region because it is not technically capable of doing so here.

For example, a parking position for the motor vehicle within the parking lot can thus be efficiently determined or ascertained based on this finding. It is thus possible to exclude, for example, regions which are not suitable for a target position, in particular a parking position, for the motor vehicle, and within which the motor vehicle cannot perform an AVP operation. The same also applies to ascertaining a route for the motor vehicle, which in such a case will not pass through such a region.

In one embodiment of the method of the present invention, it is provided that the planning includes defining at least one changeover point and/or at least one changeover region of the parking lot, at or within which changeover point or changeover region the AVP operation performed is to be changed from one AVP type over to another AVP type.

This, for example, brings about the technical advantage that a correspondingly planned AVP operation can be performed efficiently. In particular, it is thus provided that locations or regions within the parking lot are defined, at or within which locations or regions one AVP type is changed over to another AVP type when performing the AVP operation. Such changeover points and/or changeover regions are, for example, provided directly adjacent to a boundary between two regions. For example, the changeover takes place at the boundary between two regions. For example, there is a transition region, which comprises the boundary between two regions and also a region close to the boundary, for example a maximum of 5 m from the boundary, and within which the changeover is to take place.

According to one embodiment of the method of the present invention, it is provided that planning includes determining that the AVP operation for the motor vehicle is to be performed only within the region having a correspondingly ascertained AVP type for which the motor vehicle is configured.

This, for example, brings about the technical advantage that planning can be performed efficiently. In this respect, this brings about the technical advantage that a correspondingly planned AVP operation can be performed efficiently. It is thus defined in particular that the motor vehicle only performs an AVP operation within those regions for which the motor vehicle is technically configured. At this point, it is noted that a motor vehicle which can offer AVP type 1 is also technically configured to carry out AVP type 2 and AVP type 3. A motor vehicle configured for AVP type 3 can also carry out AVP type 2.

In one embodiment of the method of the present invention, it is provided that planning comprises defining which function of a correspondingly ascertained AVP type of a region of the plurality of regions is, additionally or instead, to be correspondingly performed in a vehicle-centered, infrastructure-centered, or shared vehicle-infrastructure manner.

This, for example, brings about the technical advantage that planning can be performed efficiently. In particular, this brings about the technical advantage that a correspondingly planned AVP operation can be performed efficiently. For example, one of the above-described functions according to the above table, if the table specifies, for example, that it is to be performed in a vehicle-centered manner, can additionally or instead be performed in an infrastructure-centered manner, i.e., in a manner deviating from the original specification.

In one embodiment of the method of the present invention, it is provided that one or more or all of the ascertaining steps comprise the corresponding AVP type being read from a database and/or being requested from the AVP system by the motor vehicle and/or being requested from the motor vehicle by the AVP system.

This, for example, brings about the technical advantage that the corresponding ascertaining steps can be performed efficiently.

In one embodiment of the method of the present invention, it is provided that the method comprises carrying out the planned AVP operation.

This, for example, brings about the technical advantage that an AVP operation for the motor vehicle can be performed efficiently.

In one embodiment of the method of the present invention, it is provided that the method is a computer-implemented method.

Technical functionalities of the device result directly from corresponding technical functionalities of the method, and vice versa.

In one embodiment of the method of the present invention, it is provided that the method is performed by the device.

The phrase "at least one" means "one or more."

The present invention is explained in more detail below using preferred embodiment examples.

BRIEF DESCRIPTION OF THE DRAWINGS

FIG. 1 shows a flowchart of an example method according to the first aspect of the present invention.

FIG. 2 shows an example device according to the second aspect of the present invention.

FIG. 3 shows a machine-readable storage medium according to the fourth aspect of the present invention.

DETAILED DESCRIPTION OF EXAMPLE EMBODIMENTS

Figure 4:
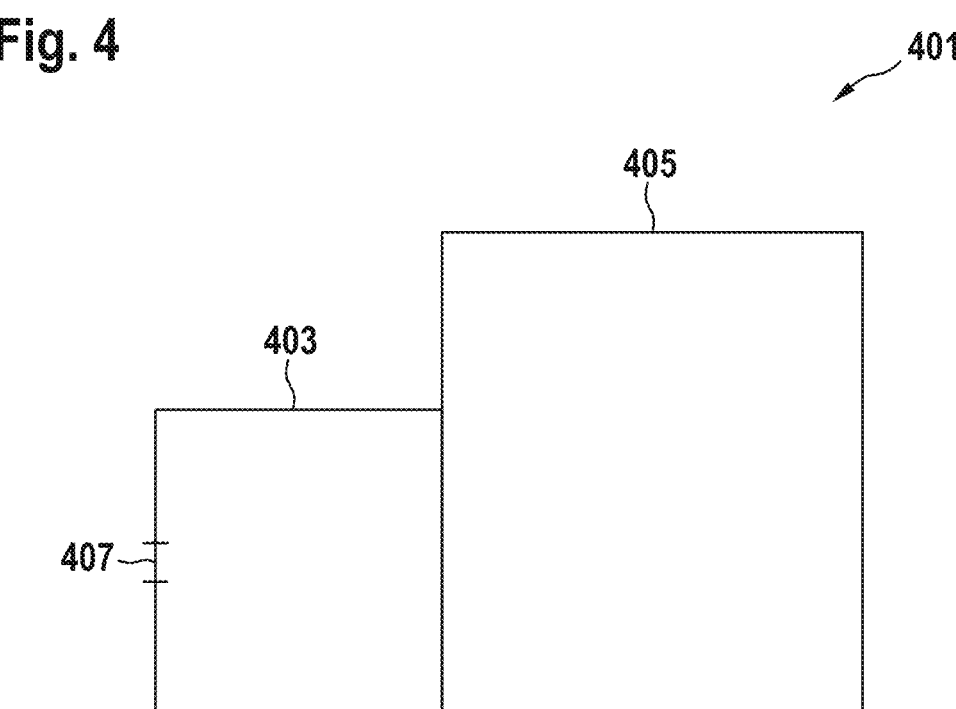
FIG. 4 shows a parking lot according to an example embodiment of the present invention.

FIG. 1 shows a flowchart of a method for planning an AVP operation for a motor vehicle within a parking lot using an infrastructure AVP system, wherein the AVP system is configured for at least two AVP types for performing an AVP operation, wherein an AVP type is an element selected from the following group of AVP types: AVP type 1, AVP type 2, and AVP type 3, wherein AVP type 1 is a vehicle-centered AVP operation, wherein AVP type 2 is an infrastructure-centered AVP operation, and wherein AVP type 3 is a shared vehicle-infrastructure AVP operation, wherein the parking lot comprises a plurality of regions, within each of which an AVP operation according to a different AVP type can be performed, comprising the following steps:

ascertaining 101 for which infrastructure AVP types the AVP system is configured to perform an AVP operation, ascertaining 103 within which region of the plurality of regions which of the infrastructure AVP types ascertained can be used for performing an AVP operation, ascertaining 105 for which vehicle AVP type(s) the motor vehicle is configured to perform an AVP operation, planning 107 an AVP operation for the motor vehicle to be performed within the parking lot, based on the infrastructure AVP types ascertained corresponding in each case to the plurality of regions and based on the vehicle AVP type(s) ascertained.

FIG. 2 shows a device 201, which is configured to carry out all steps of the method according to the first aspect.

FIG. 3 shows a machine-readable storage medium 301, on which a computer program 303 is stored. The computer program 303 comprises instructions which, when the computer program 303 is carried out by a computer, cause this computer to carry out a method according to the first aspect.

FIG. 4 shows a parking lot 401, comprising a first region 403 and a second region 405. The parking lot 401 further comprises an entrance 407 into the first region 403.

The first region 403 is configured to perform an AVP operation according to AVP type 2. The second region 405 is configured for an AVP operation according to AVP type 3. As a result, it is also possible, in particular in the second region 405, to perform an AVP operation according to AVP type 2.

The first region 403 is for example a roofed region, for example a parking garage of the parking lot 401. The second region 405 is for example an open area of the parking lot 401.

Within the first region 403, according to this embodiment, a motor vehicle can, by way of example, perform only an AVP operation according to AVP type 2. Within the second region 405, a motor vehicle can in each case, by way of example, partially carry out or perform only an AVP operation according to AVP types 2 and 3.

Figure 5:
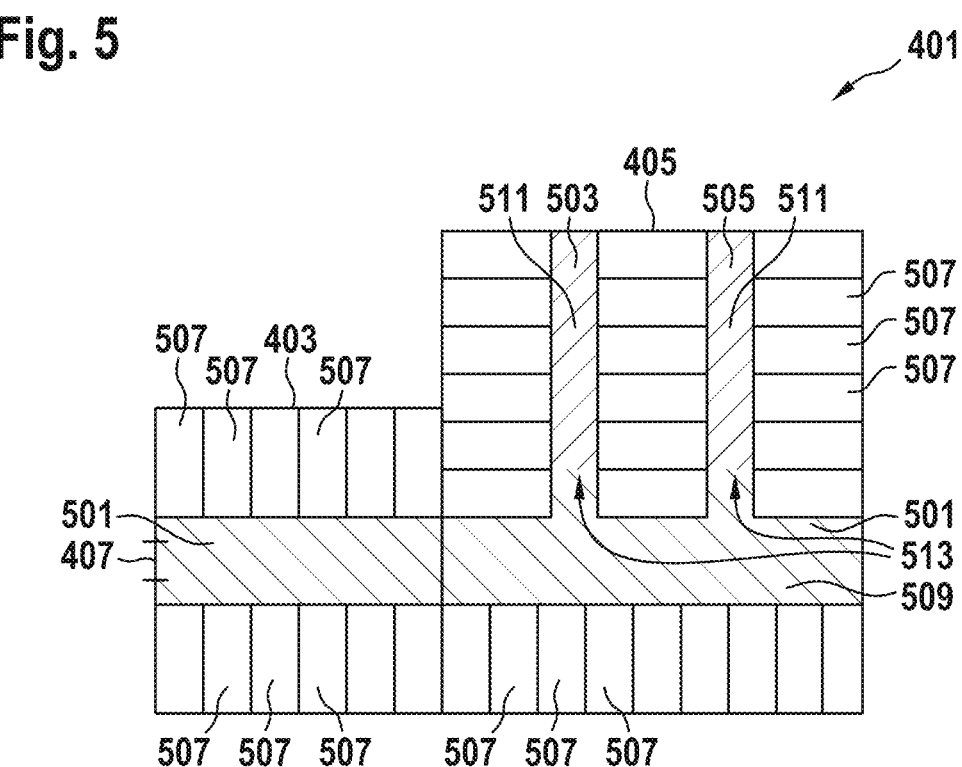
FIG. 5 shows the parking lot according to FIG. 4 in a more detailed view.

FIG. 5 shows the parking lot 401 according to FIG. 4 in a more detailed view.

As shown in FIG. 5, a driving path 501 extends within the two regions 403, 405 from left to right relative to the planes of the paper. Within the second region 405, a second driving path 503 and a third driving path 505 branch off from the first driving path 501 in a direction perpendicular thereto.

Provided transversely to the driving paths 501, 503, 505 is a plurality of parking spaces 507 for motor vehicles, in which parking spaces motor vehicles can be parked.

Furthermore, a first hatched area is marked with the reference sign 509 and a second hatched area is marked with the reference sign 511.

According to the planning stage of an AVP operation according to the features according to the present invention described here, it is provided that it is determined that, within the first hatched area 509, the AVP operation according to AVP type 2 is performed, even if the motor vehicle is already in the second region. Within the second hatched area 511, it is provided that the AVP operation according to AVP type 3 is performed. At transition regions 513 between these two hatched areas 509, 511, a changeover between AVP type 2 and AVP type 3, or vice versa, is provided.

The background to this is that a motor vehicle which can offer AVP type 3 can also carry out AVP type 2. This means that a motor vehicle which offers AVP type 3 is parked within the second region 405. A motor vehicle which can only offer AVP type 2 is parked in the first region 403 only.

An AVP operation for a motor vehicle which can offer AVP type 3 can thus be planned as follows: The motor vehicle drives according to AVP type 2 through the first region 403 and also continues to travel according to AVP type 2 within the second region 405, as long as the motor vehicle is still located within the first hatched area 509. Within the defined transition regions 513, a changeover from AVP type 2 to AVP type 3 then takes place.

In summary, the features described here according to the present invention provides in particular for planning an AVP operation for a motor vehicle within a parking lot comprising a plurality of regions, which offer different AVP types. It is for example provided that, at the beginning, i.e., before the AVP operation starts, it is ascertained which AVP types are actually possible in the parking lot. In particular, a check is performed as to which region offers which AVP type.

It is further ascertained which AVP types are offered by the motor vehicle, i.e., whether it is actually possible for the motor vehicle to perform an AVP operation within the parking lot.

As a source of this information, a digital map for example is provided and/or the AVP system provides the information regarding the infrastructure AVP types. In this case, the AVP system is located for example locally on site. For example, a cloud infrastructure may be provided in which, for example, a database is implemented, from which the information regarding the infrastructure AVP types can be retrieved. For example, it may be provided that the information regarding the vehicle AVP types is stored in the vehicle itself and is provided by the latter.

Thus, if it is possible for the motor vehicle to perform an AVP operation within a parking lot, it is for example ascertained within which of the regions the AVP operation for the motor vehicle can be performed. For example, ascertaining in such a manner may find that the motor vehicle can only perform an AVP operation in one or some of the plurality of regions. For example, a motor vehicle which is configured only for AVP type 2 cannot perform an AVP operation in a region which offers AVP type 3 and/or AVP type 1.

If the motor vehicle offers a plurality of AVP types and/or if the motor vehicle offers AVP type 1, meaning that it can also carry out AVP type 2 and AVP type 3 operations, it is provided, for example, that changeover points or changeover regions, in which or at which a changeover between different AVP types occurs, are defined between the individual regions.

Such a changeover then has the result that the functions according to the above table are for example no longer performed by the vehicle but are instead performed in an infrastructure-centered manner, or vice versa. In particular, it is thus for example provided that responsibility for the AVP operation shifts from the motor vehicle to the infrastructure, or vice versa, or responsibility is shared.

If there are multiple options regarding an AVP type for performing an AVP operation, it is for example provided that such an AVP type is specified.

For example, the object detection and event detection function according to the above table in AVP type 3 can be performed by the vehicle and/or the infrastructure. For example, it is also possible to define an option which deviates from a corresponding AVP type, i.e., for example that in AVP type 2, the above object detection and event detection is additionally performed by the vehicle.

For example, it is provided that the planned AVP operation is started and for example performed.

The invention claimed is:

1. A method for planning an Automated Valet Parking (AVP) operation for a motor vehicle within a parking lot using an infrastructure AVP system, wherein the AVP system is configured for at least two different AVP types for performing an AVP operation, wherein an AVP type is an element selected from the following group of AVP types: AVP type 1, AVP type 2, and AVP type 3, wherein AVP type 1 is a vehicle-centered AVP operation, wherein AVP type 2 is an infrastructure-centered AVP operation, and wherein AVP type 3 is a shared vehicle-infrastructure AVP operation, and wherein the parking lot includes a plurality of regions, within each of which an AVP operation according to a different AVP type can be performed, the method comprising the following steps:

ascertaining for which infrastructure AVP types the AVP system is configured to perform an AVP operation;

ascertaining within which region of the plurality of regions which of the infrastructure AVP types ascertained can be used for performing an AVP operation;

ascertaining for which one or more vehicle AVP type the motor vehicle is configured to perform an AVP operation;

planning an AVP operation for the motor vehicle to be performed within the parking lot, based on the infrastructure AVP types ascertained corresponding in each case to the plurality of regions and based on the one or more vehicle AVP type ascertained.

2. The method according to claim 1, wherein the planning includes determining within which of the plurality of regions the AVP operation for the motor vehicle can be performed.

3. The method according to claim 1, wherein the planning includes defining at least one changeover point and/or at least one changeover region of the parking lot, at or within which changeover point or changeover region the AVP operation performed is to be changed over from one AVP type to another AVP type.

4. The method according to claim 1, wherein the planning includes determining that the AVP operation for the motor vehicle is to be performed only within the region of the plurality of regions having a correspondingly ascertained AVP type for which the motor vehicle is configured.

5. The method according to claim 1, wherein the planning includes defining which function of a correspondingly ascertained AVP type of a region of the plurality of regions is to be correspondingly performed in a vehicle-centered, or infrastructure-centered, or shared vehicle-infrastructure manner.

6. The method according to claim 1, wherein one or more of the ascertaining steps include the infrastructure AVP type or vehicle AVP type being read from a database and/or being requested from the AVP system by the motor vehicle and/or being requested from the motor vehicle by the AVP system.

7. The method according to claim 1, further comprising carrying out the planned AVP operation.

8. A device configured to plan an Automated Valet Parking (AVP) operation for a motor vehicle within a parking lot using an infrastructure AVP system, wherein the AVP system is configured for at least two different AVP types for performing an AVP operation, wherein an AVP type is an element selected from the following group of AVP types: AVP type 1, AVP type 2, and AVP type 3, wherein AVP type 1 is a vehicle-centered AVP operation, wherein AVP type 2 is an infrastructure-centered AVP operation, and wherein AVP type 3 is a shared vehicle-infrastructure AVP operation, and wherein the parking lot includes a plurality of regions, within each of which an AVP operation according to a different AVP type can be performed, the device configured to:

ascertain for which infrastructure AVP types the AVP system is configured to perform an AVP operation;
  ascertain within which region of the plurality of regions which of the infrastructure AVP types ascertained can be used for performing an AVP operation;

ascertain for which one or more vehicle AVP type the motor vehicle is configured to perform an AVP operation;
  plan an AVP operation for the motor vehicle to be performed within the parking lot, based on the infrastructure AVP types ascertained corresponding in each case to the plurality of regions and based on the one or more vehicle AVP type ascertained.

9. A non-transitory machine-readable storage medium on which is stored a computer program including instructions for planning an Automated Valet Parking (AVP) operation for a motor vehicle within a parking lot using an infrastructure AVP system, wherein the AVP system is configured for at least two different AVP types for performing an AVP operation, wherein an AVP type is an element selected from the following group of AVP types: AVP type 1, AVP type 2, and AVP type 3, wherein AVP type 1 is a vehicle-centered AVP operation, wherein AVP type 2 is an infrastructure-centered AVP operation, and wherein AVP type 3 is a shared vehicle-infrastructure AVP operation, and wherein the parking lot includes a plurality of regions, within each of which an AVP operation according to a different AVP type can be performed, the instructions, when executed by a computer, causing the computer to perform the following steps:

ascertaining for which infrastructure AVP types the AVP system is configured to perform an AVP operation;
  ascertaining within which region of the plurality of regions which of the infrastructure AVP types ascertained can be used for performing an AVP operation;
  ascertaining for which one or more vehicle AVP type the motor vehicle is configured to perform an AVP operation;
  planning an AVP operation for the motor vehicle to be performed within the parking lot, based on the infrastructure AVP types ascertained corresponding in each case to the plurality of regions and based on the one or more vehicle AVP type ascertained.

\* \* \* \* \*